United States Patent
Chang

(10) Patent No.: US 8,352,965 B2
(45) Date of Patent: Jan. 8, 2013

(54) TRANSMISSION METHOD AND CIRCUIT DEVICE CAPABLE OF AUTOMATIC TRANSMISSION INTERFACE SELECTION

(75) Inventor: Chih Yen Chang, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 629 days.

(21) Appl. No.: 12/572,299

(22) Filed: Oct. 2, 2009

(65) Prior Publication Data

US 2010/0088709 A1 Apr. 8, 2010

(30) Foreign Application Priority Data

Oct. 3, 2008 (TW) .............................. 97138255 A

(51) Int. Cl.
*G06F 9/54* (2006.01)
(52) U.S. Cl. .................... 719/327; 719/321; 710/260
(58) Field of Classification Search .................. 719/321, 719/327; 710/260, 261, 263, 266; 340/12.51, 340/13.26
See application file for complete search history.

(56) References Cited

U.S. PATENT DOCUMENTS 7,500,046 B1 * 3/2009 Puri et al. ...................... 710/311
2005/0078672 A1 * 4/2005 Caliskan et al. ............... 370/389

* cited by examiner

*Primary Examiner* — S. Sough
*Assistant Examiner* — Brian Wathen
(74) *Attorney, Agent, or Firm* — WPAT PC; Justin King

(57) ABSTRACT

A circuit device capable of automatic transmission interface selection and associated method are provided. The circuit device includes a first interface port, a second interface port, a first interface driver module, a second interface driver module, and a buffer module. A first interface driver module receives a first interrupt packet, converts the first interrupt packet into a first command packet, and stores the first command packet into the buffer module. A second interface driver module receives a second interrupt packet, converts the second interrupt packet into a second command packet, and stores the second command package into the buffer module. The format of the first interrupt packet is different from that of the second interrupt packet, while the first and the second command packets comply with a common format.

10 Claims, 3 Drawing Sheets

TRANSMISSION METHOD AND CIRCUIT DEVICE CAPABLE OF AUTOMATIC TRANSMISSION INTERFACE SELECTION

CROSS REFERENCE TO RELATED PATENT APPLICATION

This patent application is based on a Taiwan, R.O.C. patent application No. 0971138255 filed on Oct. 3, 2008.

FIELD OF THE INVENTION

The present invention relates to a data transmission method and an associated device, and more particularly, to a data transmission method capable of automatic transmission interface selection and an associated circuit device, and a circuit system capable of automatic transmission interface selection.

BACKGROUND OF THE INVENTION

In general, data transmission between two circuit devices may be accomplished using connection formed by physical buses and interface ports. There are numerous common interface specifications, such as Universal Serial Bus (USB), Universal Asynchronous Receiver/Transmitter (UART), Secure Digital Input/Output (SDIO), Serial Peripheral Interface (SPI), Inter-Integrated Circuit ($I^2C$) and so forth.

To adapt to various interface ports, it is necessary that manufacturers provide different corresponding circuit devices. For example, manufactures needs to provide circuit devices complying with USB interface ports when the USB interface is to be used; similarly, circuit devices complying with UART interface ports need be provided when the UART interface is to be used. Manufacturers are thus faced with increased manufacturing and management costs due to the demand of providing devices of having the same functions however in different versions in order to coordinate with the various interface ports.

In view of the above drawback, one of the objectives of the invention is to provide a data transmission method capable of automatic transmission interface selection and an associated circuit device, and a circuit system capable of automatic transmission interface selection.

SUMMARY OF THE INVENTION

It is one of the objectives of the invention to provide a data transmission method and a circuit device capable of automatic transmission interface selection, in which interrupt packets in different formats are converted by a plurality of interface driver modules into command packets complying with one common format. Therefore, merely one circuit device instead of a numerous circuit devices of different versions is needed for coordinating with various interface ports, such that manufacturing and management costs are substantially reduced.

According to one embodiment of the invention, a circuit device capable of automatic transmission interface selection comprises a first interface ports, a second interface port, a first interface driver module, a second interface driver module, and a buffer module. A first interface driver is coupled to a first interface port. The first interface driver module receives a first interrupt packet via the first interface port, converts the first interrupt packet into a first command packet, and stores the first command packet into the buffer module. A second interface driver module is coupled to a second interface port. The second interface driver module receives a second interrupt packet via the second interface port, converts the second interrupt packet into a second command packet, and stores the second command packet into the buffer module. The format of the first interrupt packet is different from that of the second interrupt packet, while the first and the second command packets comply with one common format.

According to another embodiment of the invention, a data transmission method is used in a slave circuit device comprising a first interface port and a second interface port. The data transmission method comprises steps of receiving a first interrupt packet from a first interface ports, registering a first application interface, converting the first interrupt packet into a first command packet, parsing the first command packet into a first command, generating a first reply packet according to the first command, selecting the first interface port according to the first application interface, and transmitting the first reply packet via the first interface port.

As described above, according to the data transmission method, the circuit device capable of automatic transmission interface selection and the circuit system capable of automatic transmission interface selection of the invention, interrupt packets of different formats are converted by a plurality of interface driver modules into command packets complying with one common format. Therefore, merely one circuit device instead of a numerous circuit devices of different versions is needed for coordinating with various interface ports.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
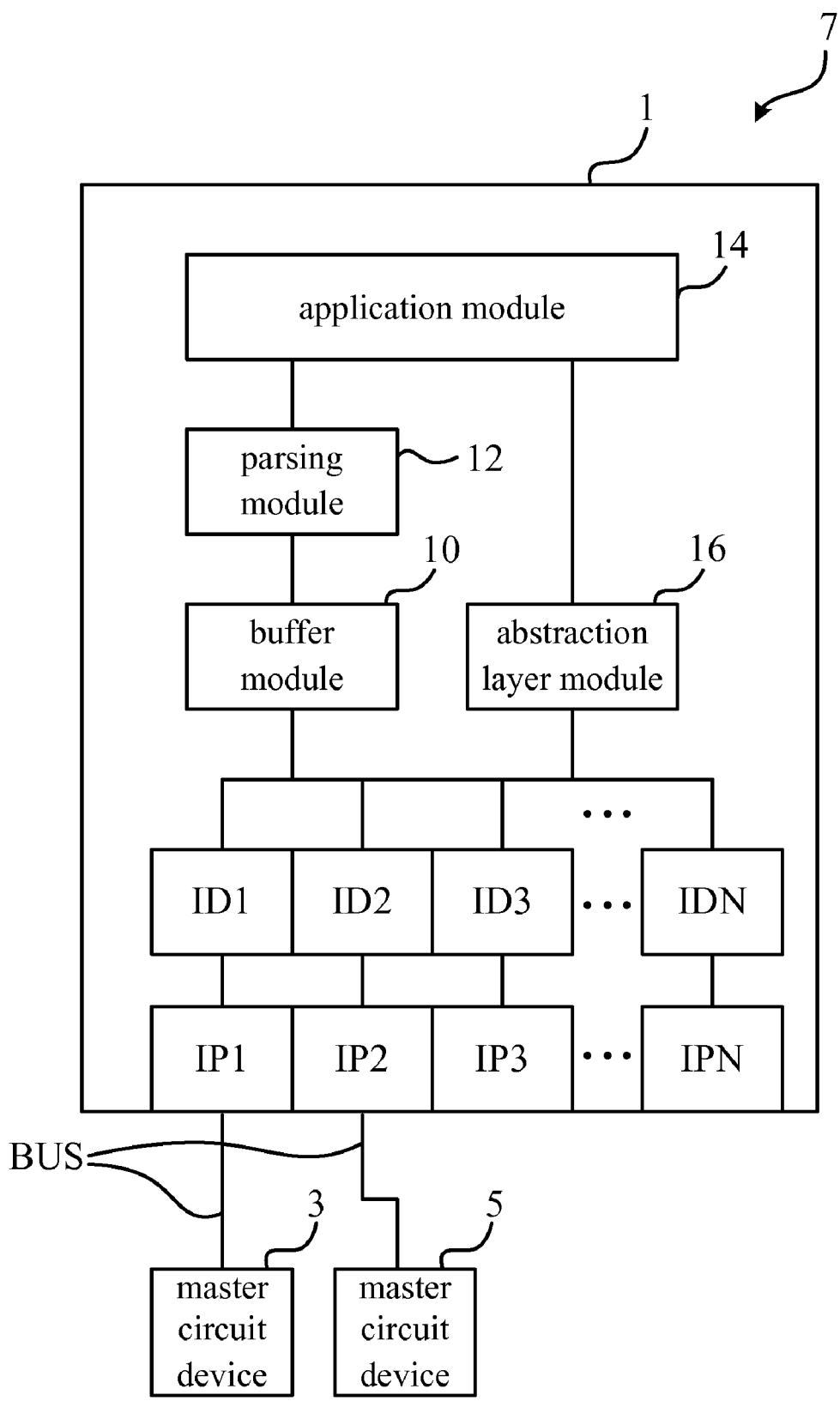
FIG. 1 is a functional block diagram of a circuit device according to one embodiment of the invention.

Please refer to FIG. 1 showing a functional block diagram of a circuit device 1 according to one embodiment of the invention. In this embodiment, the circuit device 1 is capable of automatically selecting a transmission interface. In practice, the circuit device 1 may be a radio frequency identification (RFID) circuit device but not limited thereto. As shown in FIG. 1, the circuit device 1 comprises a plurality of interface ports IP1~IPN, a buffer module 10 and a plurality of interface driver modules ID1~IDN. The interface driver modules ID1~IDN are coupled to the buffer module 10. A first interface driver module ID1 among the interface driver modules ID1~IDN is coupled to a first interface port IP1 among the interface ports IP1~IPN, a second interface driver module ID2 among the interface driver modules ID1~IDN is coupled to a second interface port IP2 among the interface ports IP1~IPN, and so forth.

For example, each of the interface ports IP1~IPN may be a USB port, a UART port, an SDIO port, an SPI port, an $I^2C$ port, or any other similar interface port. In practice, the interface ports IP1~IPN may be different from one another.

In this embodiment, the first interface driver module ID1 receives via the first interface port IP1 a first interrupt packet, converts the first interrupt packet into a first command packet and stores the first command packet into the buffer module 10; the second interface driver module ID2 receives via the second interface port IP2 a second interrupt packet, converts the second interrupt packet into a second command packet and stores the second command packet into the buffer module 10.

It is to be noted that, the format of the first interrupt packet is different from that of the second interrupt packet, while the first and second command packets comply with a common format. For example, the first interrupt command is in a USB interrupt packet format, and the second interrupt packet is in a UART interrupt packet format. After conversion, both the first and the second command packets comply with a common command format.

In one embodiment, the circuit device 1 may be connected to a master circuit device 3 via the first interface port IP, and the first interrupt packet is generated by the master circuit device 3. Therefore, the circuit device 1, via the first interface port IP1, receives the first interrupt packet generated by the master circuit device 3. Similarly, the circuit device 1 may be connected to another master device 5 via the second interface port IP2, and the second interrupt packet is generated by the master circuit device 5. Therefore, the circuit device 1, via the second interface port IP2, receives the second interrupt packet generated by the master circuit device 5. In practice, the circuit device 1 is not necessarily connected to the master circuit device 3 and the master circuit device 5 at the same time, but may be connected only to the master circuit device 3 or connected only to the master circuit device 5.

As shown in FIG. 1, in practice, the master circuit device 3 may be connected to the first interface port IP1 via a physical bus BUS, which serves as a transmission medium of the first interrupt packet. Similarly, the master circuit device 5 may be connected to the second interface port IP2 via a physical bus BUS, which serves as a transmission medium of the second interrupt packet.

In one embodiment, the circuit device 1 may further comprise a parsing module 12 coupled to the buffer module 10, as shown in FIG. 1. The parsing module 12 retrieves the first command packet and parses the same into a first command. Similarly, the parsing module 12 retrieves the second command packet and parses the same into a second predetermined command. Note that according to the aforesaid description, the first and the second command packets comply with a common format. Therefore, provided that the parsing module 12 has a parsing capability of parsing the command packets complying with the common format, the parsing procedure can be accomplished.

In one embodiment, the circuit device 1 may further comprise an application module 14 and an abstraction layer module 16. Referring to FIG. 1, the application module 14 is coupled to the parsing module 12, and the abstraction layer module 16 is coupled to the interface driver modules ID1~IDN. The application module 14 receives the first command and generates a first reply packet according to the first command. The abstraction layer module 16 transmits the first reply packet to the first interface driver module ID1. Supposing the circuit device 1 is connected to the master circuit device 3, the first interface port IP1 of the circuit device 1 then transmits the first reply packet to the master circuit device 3.

Similarly, the application module 14 also receives the second predetermined command and generates a second reply packet according to the second predetermined command. The abstraction layer module 16 transmits the second reply packet to the second interface driver module ID2. Supposing the circuit device 1 is connected to the master circuit device 5, the second interface port IP2 of the circuit device 1 then transmits the second reply packet to the master circuit device 5.

In practice, upon receiving the first interrupt packet, the first interface driver module ID1 registers a first application interface (API) at the abstraction layer module 16, which in turn transmits the first reply packet via the first API to the first interface driver module ID1. Similarly, upon receiving the second interrupt packet, the second interface driver module ID2 registers a second API at the abstraction layer module 16, which in turn transmits the second reply packet via the second API to the second interface driver module ID2. In practice, the first interface driver module ID1 and the second interface driver module ID2 may register APIs thereof by declaring function pointers.

Since the circuit device comprises various interface ports as well as capabilities for processing interrupt packets of different formats, the circuit device are capable of receiving and processing interrupt packets of different formats. Therefore, the circuit device provides compatibility between different interface ports so that manufacturers need not provide circuit devices in numerous versions in order to coordinate with different interface ports, whereby manufacturing and management costs are substantially reduced.

Figure 2A:
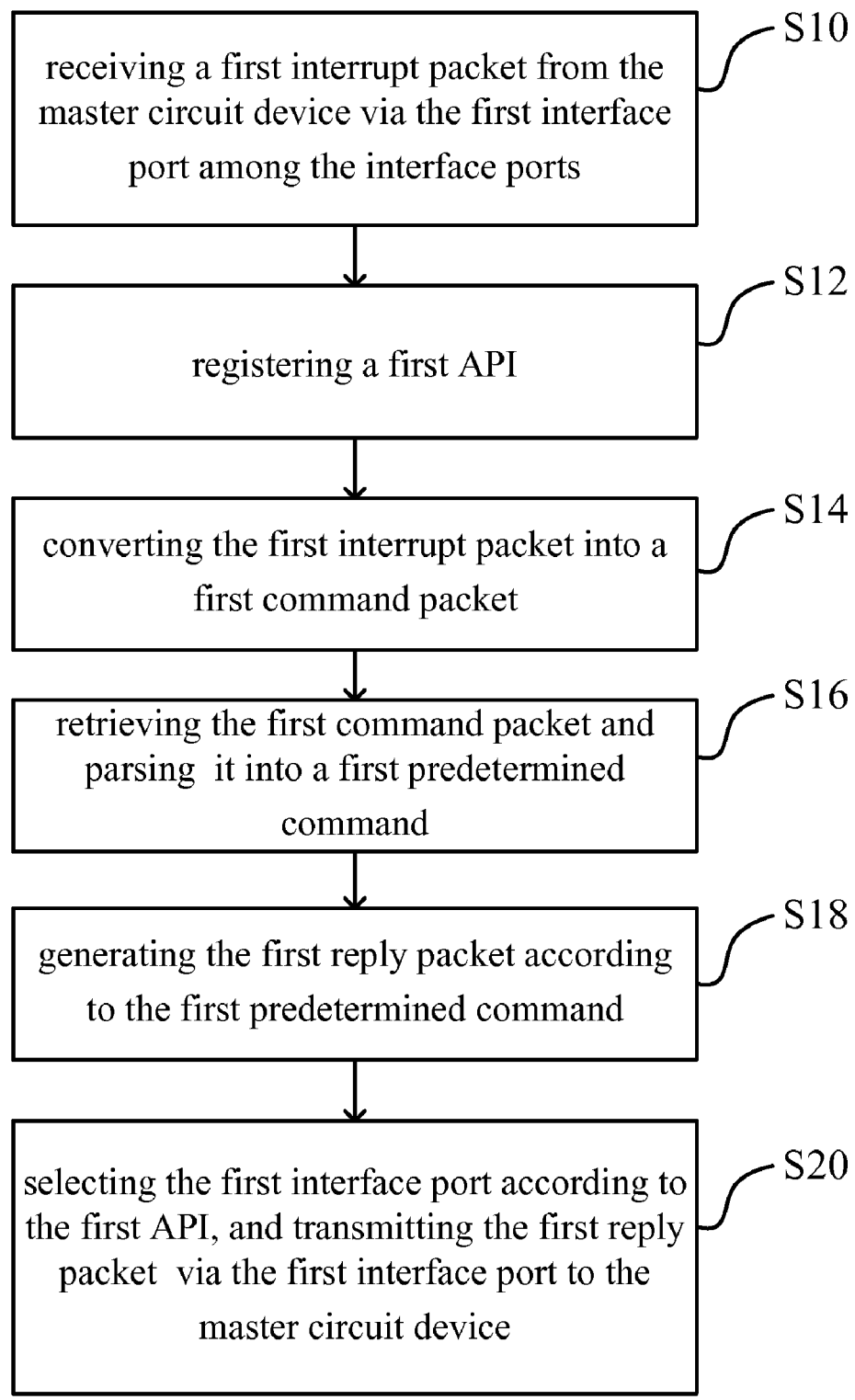
FIG. 2A is a flowchart of a data transmission method according to one embodiment of the invention.

Refer to FIG. 2A in conjunction with FIG. 1. FIG. 2A shows a flowchart of a data transmission method according to one embodiment of the invention. In this embodiment, the data transmission method is applied to a slave circuit device comprising a plurality of interface ports. In practice, the slave circuit device may be the foregoing circuit device 1 but not limited thereto.

As shown in FIG. 2, suppose the slave circuit device is connected to the master circuit device. The method starts with Step S10 of receiving a first interrupt packet from the master circuit device 3 via the first interface port IP1 among the interface ports IP1~IPN. In Step S12, a first API is registered. In Step S14, the first interrupt packet is converted into a first command packet. In Step S16, the first command packet is retrieved and parsed into a first command. In Step S18, a first reply packet is generated according to the first command. In Step S20, the first interface port IP1 is selected according to the first API, and the first reply packet is transmitted via the first interface port to the master circuit device 3.

Figure 2B:
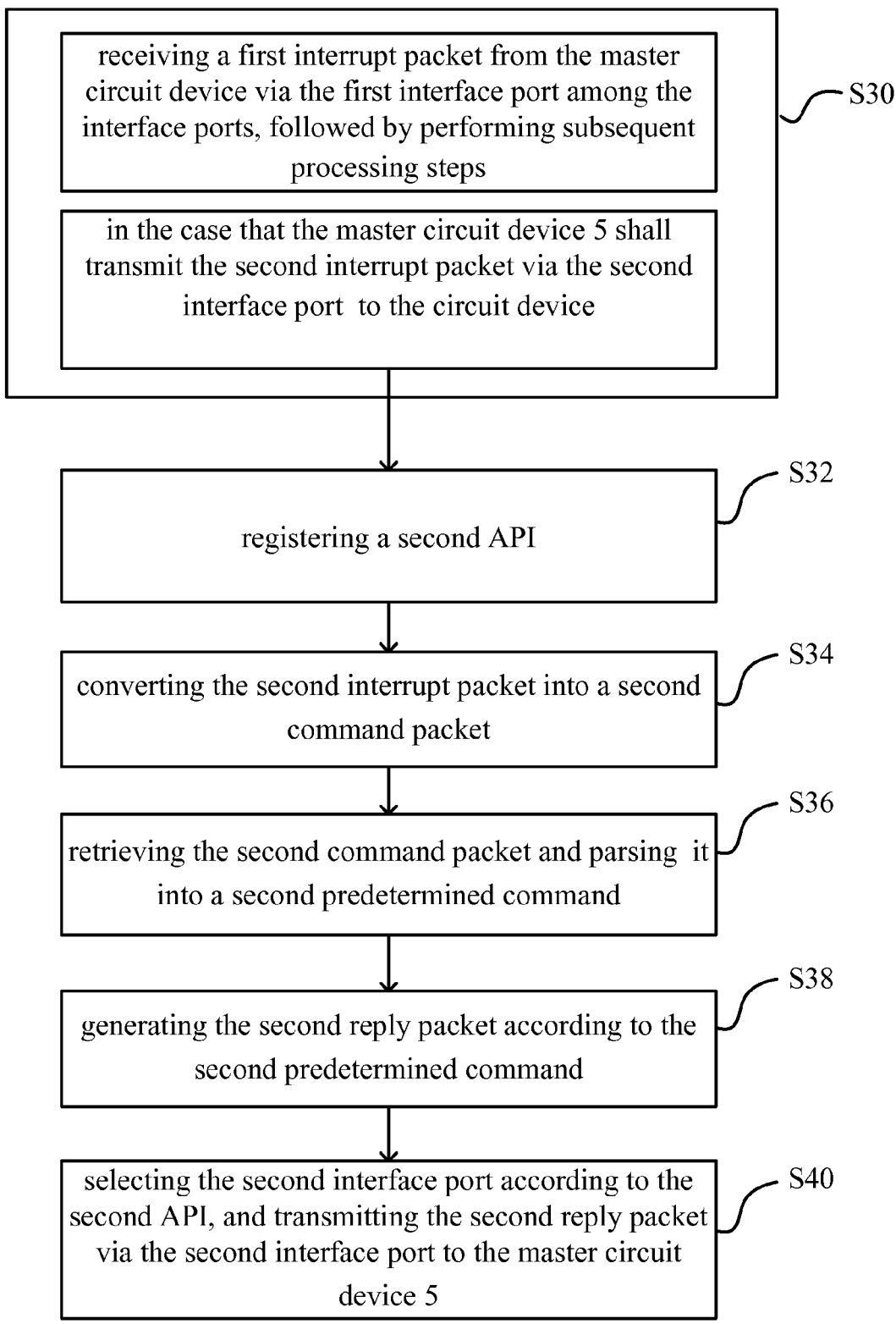
FIG. 2B is a flowchart of implementing a circuit device 1 connecting two main circuit devices according to the data transmission method of the invention.

Refer to FIG. 2B in conjunction with FIG. 1. FIG. 2B shows a flowchart of the circuit device 1 being simultaneously connected to two master circuit devices according to the data transmission method of the invention. As shown in FIG. 2B, suppose the circuit device 1 is connected to both the master circuit device 3 and the master device 5. Also suppose that the data transmission method starts with Step S30 of receiving a first interrupt packet from the master circuit device 3 via the first interface port IP1 among the interface ports IP1~IPN, followed by performing subsequent processing steps as the foregoing Step S12 to S20 to finish a complete command communication between the circuit device 1 and the master circuit device 3. In the event that the master circuit device 5 wishes to communicate with the circuit device 1 then, the master circuit device 5 shall transmit the second interrupt packet via the second interface port IP2 among the interface ports IP1~IPN to the circuit device 1. In a next Step S32, a second API is registered. Note that the format of the first interrupt packet may be different from that of the second interrupt packet.

In Step S34, the second interrupt packet is converted into the second command packet. In this embodiment, the first command packet and the second command packet comply with a common format. More specifically, supposing the first and second interrupt packets have different formats previously, the first and second command packets shall have a common format after the conversion.

In Step S36, the second command packet is retrieved and parsed into a second predetermined command. Note that according to the aforesaid description, the first command packet and the second command packet comply with a common format. Therefore, provided that the data transmission method has a parsing capability of parsing the command packets complying with the common format, the parsing procedure can be accomplished. In Step S38, a second reply packet is generated according to the second predetermined command. In Step 40, the second interface port IP2 is selected according to the second API to transmit the second reply packet to the master circuit device 5.

To ensure the abovementioned procedure is carried out properly, it is recommended that negotiation between the master circuit device 3 and the master circuit device 5 is beforehand settled to prevent the two from simultaneously sending interrupt packets to the circuit device 1. That is, for example, the master circuit device 5 is only allowed to send an interrupt packet thereof to the circuit device 1 when a complete communication cycle is finished between the master circuit device 3 and the circuit device 1.

Refer to FIG. 1 also showing a functional block diagram of a circuit system 7 according to another embodiment of the invention. In this embodiment, the circuit system 7 is capable of automatic transmission interface selection. As shown, the circuit system 7 comprises a master circuit device 3, a circuit device 1 and a physical bus BUS. The circuit device 1 comprises interface ports IP1~IPN, a buffer module 10 and interface driver modules ID1~IDN. Details of the master circuit device 3, the circuit device 1 and the physical bus BUS are as discussed above, and shall be omitted for brevity. Note that the circuit system 7 may further comprise a master circuit device 5 but not limited thereto. In practice, the circuit device 1 is not necessarily connected to both the master circuit device 3 and the master circuit device 5 at the same time, but may be connected only to the master circuit device 3 or connected only to the master circuit device 5.

In conclusion, according to the data transmission method, the circuit device capable of automatic transmission interface selection and the circuit system capable of automatic transmission interface selection of the invention, interrupt command packets of different formats are converted by a plurality of interface driver modules into command packets complying with a common format. Further, since the circuit device comprises various interface ports as well as capabilities for processing interrupt packets of different formats, the circuit device is capable of receiving and processing interrupt packets of different formats; that is, the circuit device provides compatibility between different interface ports. Therefore, compared with the prior art, the invention provides a single circuit device, instead of numerous circuit devices of different version, for coordinating with different interface ports, whereby manufacturing and management costs are substantially reduced.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A circuit device capable of automatic transmission interface selection, comprising:
   a first interface port;
   a second interface port;
   a first interface driver module, coupled to said first interface port, configured to receive a first interrupt packet in a first format from said first interface port, and convert said first interrupt packet into a first command packet in a third format;
   a second interface driver module, coupled to said second interface port, configured to receive a second interrupt packet in a second format, and convert said second interrupt packet into a second command packet in said third format; and
   a buffer module, coupled to said first interface driver module and said second interface driver module, configured to receive and store said first interrupt packet in said third format from said first interface driver module, and configured to receive and store said second command packet from said second interface driver module; and
   a parsing module, coupled to said buffer module, configured to receive and parse said first command packet into a first command;
   wherein said first format is different from said second format.

2. The circuit device as claimed in claim 1, further comprising:
   an application module, coupled to the parsing module, configured to receive the first command and generate a first reply packet according to the first command; and
   an abstraction layer module, coupled to the application module and said first interface driver module and said second interface driver module, configured to transmit the first reply packet to the first interface driver module.

3. The circuit device as claimed in claim 2, wherein when the first interface driver module receives the first interrupt packet, the first interface driver module is configured to register a first application interface (API) at the abstraction layer module; and said abstraction layer module is configured to transmit the first reply packet to the first interface driver module according to the first API.

4. The circuit device as claimed in claim 2, wherein the circuit device is configured to receive via the first interface driver module the first interrupt packet generated by a first master circuit device, and transmit the first reply packet via the first interface port to the first master circuit device.

5. The circuit device as claimed in claim 1, wherein the first interface port is in compliance with Universal Serial Bus (USB), Universal Asynchronous Receiver/Transmitter (UART), Secure Digital Input/Output (SDIO), Serial Peripheral Interface (SPI), or Inter-Integrated Circuit ($I^2C$).

6. The circuit device as claimed in claim 1, is a radio frequency identification (RFID) circuit device.

7. A data transmission method, applied in a slave circuit device comprising a first interface port and a second interface port, comprising steps of:
   receiving a first interrupt packet in a first format via said first interface port;
   registering a first application interface (API);
   converting said first interrupt packet into a first command packet in a third format;
   parsing said first command packet into a first command;
   generating a first reply packet according to said first command; and selecting said first interface port according to said first API, and transmitting said first reply packet via said first interface port.

8. The data transmission method as claimed in claim 7, further comprising steps of:
receiving a second interrupt packet in a second format via said second interface port; and
converting said second interrupt packet into a second command packet in said third format;
wherein said first format is different from said second format.

9. The data transmission method as claimed in claim 7, wherein the first interface port is in compliance with USB, UART, SDIO, SPI, or I$^2$C.

10. The data transmission method as claimed in claim 7, wherein the slave circuit device is an RFID circuit device.

* * * * *